US009281652B1

(12) United States Patent
Fanning et al.

(10) Patent No.: US 9,281,652 B1
(45) Date of Patent: Mar. 8, 2016

(54) UNSTABLE OPO RESONATORS WITH IMPROVED BEAM QUALITY

(75) Inventors: C. Geoffrey Fanning, Portland, OR (US); David R. Balsley, Portland, OR (US)

(73) Assignee: nLIGHT Photonics Corporation, Vancouver, WA (US)

( * ) Notice: Subject to any disclaimer, the term of this patent is extended or adjusted under 35 U.S.C. 154(b) by 418 days.

(21) Appl. No.: 13/532,681

(22) Filed: Jun. 25, 2012

(51) Int. Cl.
*H01S 3/108* (2006.01)
*H01S 3/06* (2006.01)

(52) U.S. Cl.
CPC ............. *H01S 3/1083* (2013.01); *H01S 3/0615* (2013.01)

(58) Field of Classification Search
CPC ..... H01S 3/025; H01S 3/0615; H01S 3/0621; H01S 3/08059; H01S 3/1083; H01S 3/113
USPC ........................................................... 372/70
See application file for complete search history.

(56) References Cited

U.S. PATENT DOCUMENTS

| 5,260,964 | A | 11/1993 | Morin et al. | |
|---|---|---|---|---|
| 5,390,211 | A * | 2/1995 | Clark et al. | 372/95 |
| 5,557,630 | A | 9/1996 | Scaggs | |
| 5,841,798 | A * | 11/1998 | Chen et al. | 372/11 |
| 6,101,022 | A | 8/2000 | Chen et al. | |
| 6,373,865 | B1 | 4/2002 | Nettleton et al. | |
| 6,914,928 | B2 * | 7/2005 | Trussell, Jr. | 372/71 |
| 7,149,231 | B2 | 12/2006 | Afzal et al. | |
| 7,248,608 | B2 | 7/2007 | Nettleton | |
| 7,428,252 | B1 | 9/2008 | Nettleton et al. | |
| 7,532,650 | B2 * | 5/2009 | Nettleton et al. | 372/18 |
| 8,306,074 | B2 | 11/2012 | Nettleton et al. | |
| 2004/0066805 | A1 | 4/2004 | Afzal et al. | |
| 2006/0280221 | A1 | 12/2006 | Seitel | |
| 2007/0121689 | A1 | 5/2007 | Brown | |
| 2010/0189140 | A1 | 7/2010 | Nettleton et al. | |

OTHER PUBLICATIONS

Y. P. Huang et al., Subnanosecond mJ eye-safe laser with an intracavity optical parametric oscillator in a shared resonator, Optics Express, Feb. 2, 2009, 1551-1556, vol. 17, No. 3.
Bradley W. Schilling et al., End-pumped monoblock laser for eyesafe targeting systems, Army Belvoir Research and Development and Engineering Center, Night Vision and Electronic Sensors Directorate (NVESD), Nov. 1, 2006, available online at http://www.dtic.mil/get-tr-doc/pdf?AD=ADA480960.
A.D. Hays et al., Improvements in Monoblock Performance using External Reflector, Proceedings of the SPIE, Feb. 2012, 823613-1 to 823613-7, Proc. of SPIE vol. 8236.

(Continued)

*Primary Examiner* — Xinning Niu
(74) *Attorney, Agent, or Firm* — Klarquist Sparkman, LLP

(57) ABSTRACT

A laser system includes a laser resonator having a laser resonator volume and a gain block disposed therein, the gain block being configured to emit light at a predetermined laser wavelength, and an OPO unstable resonator having an OPO unstable resonator volume, the OPO unstable resonator optically coupled to the laser resonator and configured to receive light therefrom, wherein a portion of the OPO unstable resonator volume is situated with respect to the laser resonator volume so as to form an overlapping volume.

27 Claims, 2 Drawing Sheets

(56) References Cited

OTHER PUBLICATIONS

Brian Cole et al., Compact VCSEL pumped Q-switched Nd:YAG lasers, Proceedings of the SPIE, Feb. 2012, 82350O-1 to 82350O-7, Proc. of SPIE vol. 8235.

John Nettleton et al., Micro-Laser Range Finder Development: Using the Monolithic Approach, US Army CECOM RDEC NVESD, Fort Belvoir, VA, available online at http://www.dtic.mil/cgi-bin/GetTRDoc?AD=ADA390304.

* cited by examiner

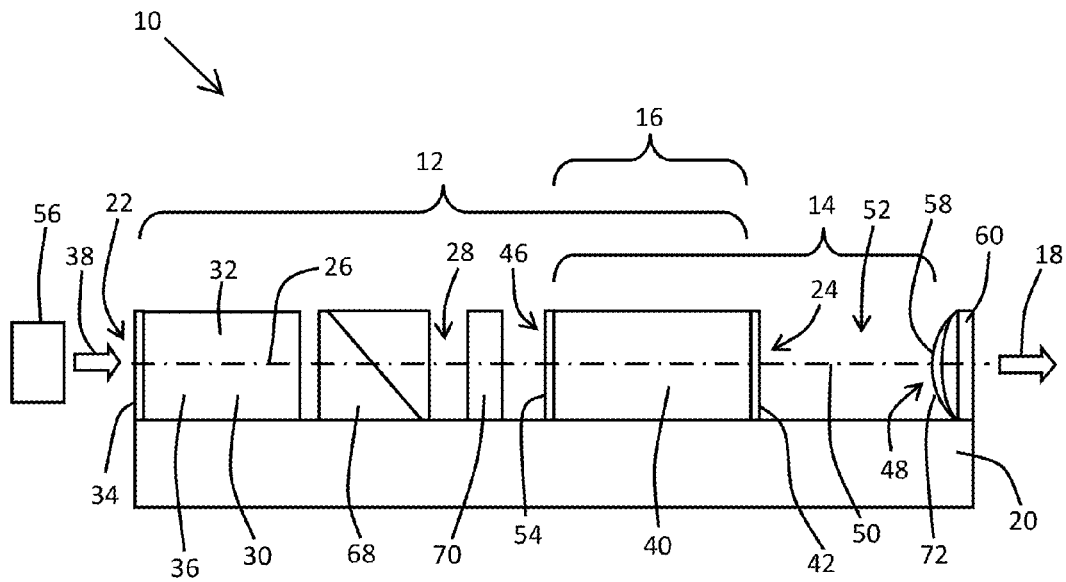
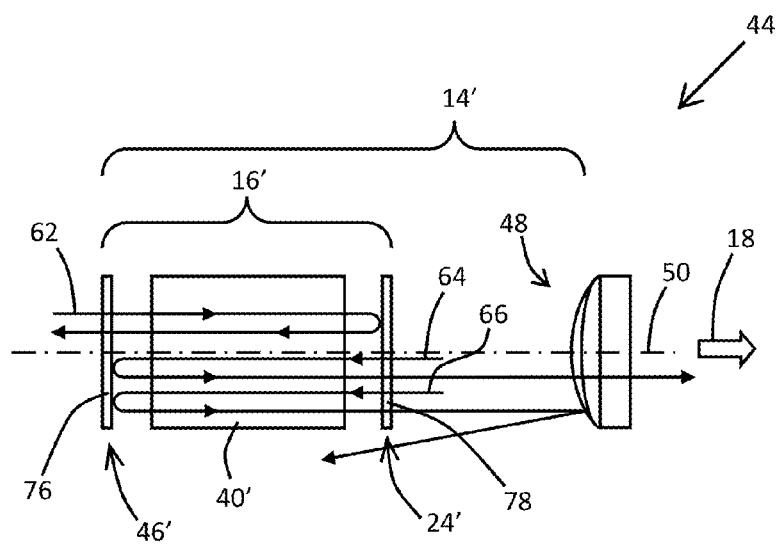
FIG. 1
FIG. 2

UNSTABLE OPO RESONATORS WITH IMPROVED BEAM QUALITY

BACKGROUND OF THE INVENTION

1. Field of the Invention

Generally, the field of the present invention is solid state lasers. More particularly, the present invention relates to unstable OPO resonators emitting beams having superior beam quality.

2. Background

Reliability and accuracy requirements in the laser rangefinder arts have stimulated active development in the laser rangefinder arts for some time. Many notable breakthroughs have made it possible for laser rangefinders and related laser systems to be used in increasingly rugged environments while operating at increasingly heightened specifications. For example, in U.S. Pat. No. 6,373,865 to Nettleton et al. a pseudo-monolithic laser with an intracavity optical parametric oscillator provides the functionality of many ordinarily difficult-to-package discrete optical components, each with associated optical mounts, through an easy assembly that may be permanently adjusted in a very short amount of time. In U.S. Pat. No. 7,532,650, also to Nettleton et al., another significant advance to monoblock type systems came with the inclusion of a convex lens for improved beam quality.

However, beam quality remains relatively poor, resulting in heightened mechanical requirements, such as larger lenses and apertures, contributing detrimentally to system size, weight, and overall functionality. Thus, a need remains for a lightweight and easy to manufacture laser system that can provide improved beam quality at farther distances.

SUMMARY OF THE INVENTION

Accordingly, in a broad aspect an innovation is provided satisfying the aforementioned need in a laser system that includes a laser resonator having a laser resonator volume and a gain block disposed therein, the gain block configured to emit light at a predetermined laser wavelength, and an optical parametric oscillator (OPO) unstable resonator having an unstable resonator volume, the OPO unstable resonator optically coupled to the laser resonator and configured to receive light therefrom, wherein a portion of the OPO unstable resonator volume is situated with respect to the laser resonator volume so as to form an overlapping volume.

According to another aspect of the present invention a monoblock laser system includes a laser resonator including first and second reflectors defining a stable or borderline resonator volume and including a gain block capable of emitting light at a first wavelength, and an unstable resonator including first and second reflectors defining an unstable resonator volume and including optical parametric gain crystal capable of emitting light at a second wavelength using light at the first wavelength, the unstable resonator second reflector capable of transmitting an output beam at the second wavelength, wherein the unstable resonator volume overlaps the laser resonator volume such that the unstable resonator second reflector is not also the laser resonator second reflector.

According to still another aspect of the present invention a laser system includes a stable resonator and volume defined thereby, and an unstable resonator and volume defined thereby, wherein a portion of the unstable resonator volume overlaps the stable resonator volume, wherein the unstable resonator includes an output coupler having a variable reflectivity.

The foregoing and other objects, features, and advantages will become more apparent from the following detailed description, which proceeds with reference to the accompanying drawings, which are not necessarily drawn to scale.

BRIEF DESCRIPTION OF THE DRAWINGS

FIG. 1 is side view of an exemplary embodiment of a laser system according to the present invention.

FIG. 2 is a close-up view of a portion of an alternative exemplary embodiment of the laser system according to the present invention.

DETAILED DESCRIPTION OF THE INVENTION

Figure 3:
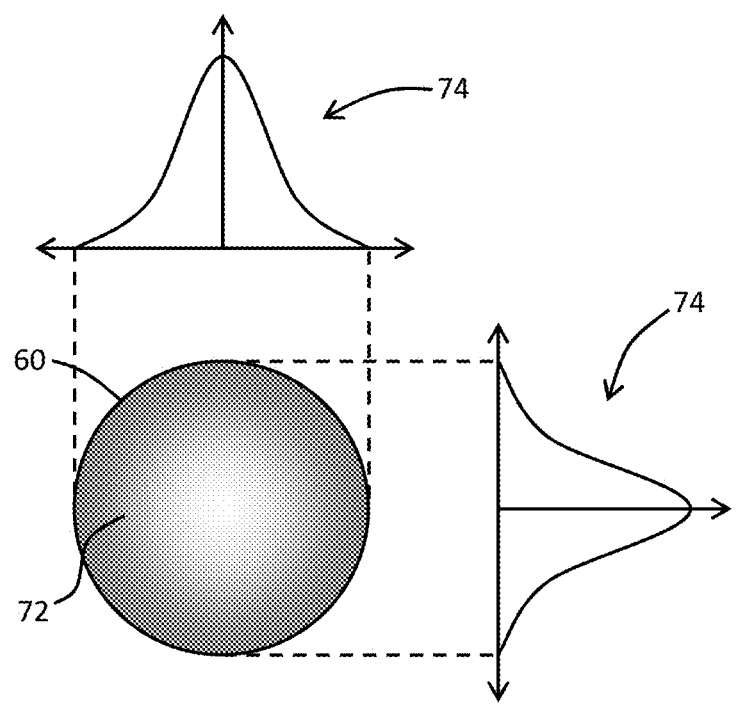
FIG. 3 is a front view of a lens and associated projections of reflectivity profiles according to an aspect of the present invention.

Referring now to the drawings herein, FIG. 1 illustrates an exemplary embodiment of a laser system, generally designated 10, in accordance with the principles of the present invention. The laser system 10 includes a laser resonator 12 and an OPO unstable resonator 14 optically coupled together so as to form an overlapping volume 16. Laser system 10 is generally capable of emitting an output beam 18 and the various components that will be described hereinafter are typically mounted onto a temperature coefficient matched substrate 20. The laser resonator 12, and corresponding aspects thereof, generally includes resonators that are stable as well as resonators that are at the stable-unstable border, such as flat-flat resonators. Also, the temperature coefficient matched substrate 20 generally includes substrates that can have various temperature related coefficients that are similar between substrates, such as coefficients of thermal expansion or thermal conductivities. As will be discussed hereinafter, the laser systems disclosed herein include light beams characterized by one or more wavelengths. In general, suitable wavelengths of operation can include from a few hundred nanometers up to about 10 µm.

The laser resonator 12 includes first and second opposite surfaces 22, 24 that define a laser resonator optical axis 26 therebetween and a laser resonator volume 28. Surfaces 22, 24 are highly reflective at a suitable laser resonator wavelength or wavelength range (hereinafter "wavelength") to form OPO pump light. The laser resonator 12 also includes a gain medium 30, a gain block being a convenient example thereof, positioned between the opposite surfaces 22, 24 and configured to lase at the suitable wavelength and emit a light beam therefrom. For example, 1064 nm is one such suitable wavelength emitted by the excited ions of Nd:YAG crystals of the gain block 30. The gain block 30 may have other active materials, including ones capable of other wavelengths, as well as combinations thereof, may be used as well, such as Nd:YLF or other host crystals.

Various optical surfaces in embodiments of laser systems 10 in accordance with the present invention include coatings, each typically having one or more layers of dielectric material and configured to provide predetermined reflectivity characteristics for one or more wavelengths or range of wavelengths. For some wavelengths coatings may provide with a high degree of reflectivity, such as reflectivities from 80% to 99%, as well as reflectivities over 99%. For some wavelengths coatings may provide very high transmissivities (anti-reflectivity), such as transmissivities from 80%-99%, as well as transmissivities over 99%. As shown in FIG. 1 first surface 22 has a coating 34 that is highly reflective at the suitable wavelength and that may be anti-reflective at a gain block pump wavelength, for example, at 808 nm. Gain block pump light 38 from an external pump source 56, such as a separate laser, may then be transmitted into laser resonator 12 through first surface 22, or, as with some embodiments, through other sides 36 of gain block 30, so as to excite gain block 30 to lase at the suitable wavelength. The light that is stimulated to emit from gain block 30 and that is directed towards surface 22 can then be reflected back through gain block 30 for additional amplification towards second surface 24. Second surface 24 is also situated along optical axis 26 such that it can receive light emitted by the gain block 30 as well as light reflected by first surface 22. In some embodiments, one or more other sides 36 of the gain block 30 are pumped with gain block pump light 38. In such configurations, anti-reflective properties at the gain block pump wavelength are typically applied to the sides 36 with a coating 32 exhibiting optimal reflectivity characteristics. For example, for optical transmission of pump light 38 through side 36 it can become less important to provide high reflectivity at the wavelength of the gain block 30. Similarly, in such arrangements it can become less important that surface 22 include high transmissivity at the wavelength of pump light 38.

An optical parametric oscillator (OPO) nonlinear optical crystal 40 is situated along optical axis 26 between gain block 30 and second surface 24 and in the overlapping volume 16. With light received at 1064 nm, crystal 40 can provide output light in a variety of different spectra, including eye-safe spectra such as at or near 1570 nm. In other embodiments different output wavelengths may be achieved by varying the incident OPO pump wave or the characteristics of the laser system 10 such as the attributes of the nonlinear optical crystal 40. Moreover, more than one nonlinear optical crystal 40 may be used or different waves can be mixed, allowing various higher harmonic generation, such as third or fourth, etc., or conversion to longer wavelengths. As shown in FIG. 1, second surface 24 is formed on an opposite side of crystal 40. Second surface 24 of laser resonator 12 has a coating 42 that is highly reflective at the OPO pump wavelength of the nonlinear crystal 40, e.g., 1064 nm, so that OPO pump light may be reflected back through the crystal 40 towards gain block 30 for further amplification and that is anti-reflective at the wavelength of signal light generated by the OPO crystal 40, e.g., at 1570 nm, to allow transmission thereof. The wavelength of signal light in output beam 18 may be tuned or selected to provide other predetermined wavelengths by varying the characteristics of the various components of the laser system 12. Wavelengths generally in the range of 1 to 2 μm are suitable, such as 1570 nm, though other output wavelengths are possible.

OPO unstable resonator 14 includes opposing surfaces 46, 48 aligned with an unstable resonator optical axis 50 and forming an OPO unstable resonator volume 52 of the optical parametric oscillator unstable resonator 14. Optical axes 26, 50 may be coaxially aligned though in some embodiments, axes 26, 50 are not coaxial in their entirety. For example, various optics may be disposed to alter the paths of the optical axes 26, 50 and the respective beams associated therewith. Accordingly, various system geometries are within the scope of present invention that may differ from the simple linear setup shown in the various Figures herein, including folded type geometries.

Referring again to FIG. 1, light at the OPO wavelength propagating along optical axis 50 of the OPO unstable resonator 14 encounters opposing first and second reflective surfaces 46, 48. First surface 46 has a coating 54 that is highly reflective at the OPO signal wavelength, e.g., 1570 nm, and that is anti-reflective at a wavelength of gain block 30, or OPO pump wavelength, e.g., 1064 nm. Second surface 48 includes a coating 58 that is partially transmissive at the OPO signal wavelength so that a portion of such light may be coupled out of the laser system 10 in the form of an output beam 18 for subsequent application. OPO signal light that is reflected back into unstable resonator volume 52 may be used to provide additional signal light, as will be discussed further hereinafter.

Second surface 48 forms a part of an optical component, such as a convex mirror 60. For surfaces 46, 48 that are flat and convex, respectively, the resonator 14 defined thereby has g-parameters defined by the length, the surfaces, and the radius of curvatures thereof. The multiplication of the resulting g-parameters provides a value that is outside the confinement condition for stable resonators. For example, in FIG. 2 there is shown a portion of an alternative embodiment of the laser system, generally designated 44, in accordance with the present invention. (For purposes of clarity, components of the illustrated portion of the laser system 44 in FIG. 2 that differ somewhat from those of the laser system 10 of FIG. 1 are identified herein by the same reference numbers but with a prime symbol thereafter.) Also, a depiction is shown of laser operation in combination with the instability of OPO unstable resonator 14' illustrated in relation to overlapping volume 16'.

As shown, first surface 46' of OPO unstable resonator 14' is disposed on a separate optical substrate 76 so that surface 46' is adjacently situated and spaced apart from nonlinear optical crystal 40'. Similarly, second surface 24' of laser resonator 12 (FIG. 1) is also disposed on a separate optical substrate 78 so that surface 24' is adjacently situated and spaced apart from nonlinear crystal 40'. The surfaces of the nonlinear optical crystal 40' typically include anti-reflective coating (not shown) at OPO and pump wavelengths. Because optical substrates 76, 78 defining surfaces 46', 24' are spaced apart, one or both sides of the substrates 76, 78 can define respective surfaces 46', 24'. Accordingly, one or both sides of the substrates 76, 78 may include coatings having transmissivity and reflectivity characteristics optimized for a spaced apart configuration. Sample operation thereof will now be described in a simplified symbolic way with optical rays.

An OPO pump ray 62 is directed through unstable resonator first surface 46' and through crystal 40'. While many rays may interact parametrically with crystal 40' to form OPO signal rays, here for illustrative purposes pump ray 62 fails such an interaction and instead completes a round-trip of overlapping volume 16' propagating through crystal 40' and reflecting off laser resonator second surface 24' to return back through crystal 40' and through surface 46'. Separately, example signal rays 64, 66 are shown in oscillation within OPO unstable resonator 14'. The trace of ray 64 demonstrates the transmissivity of second surface 24' of laser resonator 12 in combination with the reflectivity of first surface 46' of OPO unstable resonator 14'. With second surface 48 being partially transmissive, ray 64 here propagates therethrough forming a portion of an output beam 18 of the laser system 10. Other rays similar to ray 64 which propagate close to optical axis 50, and substantially parallel therewith, may be reflected at surface 48 and back through crystal 40'. The trace of ray 66 propagates similarly to ray 64 though due to radial distance from optical axis 50, reflection off the convex second surface 48 causes ray 66 to diverge from the resonator volume 52. Thus, rays disposed more radially outward from optical axis 50 tend to diverge more quickly in the OPO unstable resonator 14' than rays proximate the optical axis 50. Example idler rays, which also form a part of the nonlinear parametric interaction, are omitted from FIG. 2 for clarity.

Optical beams propagating in resonator volumes can be described in part by the ray tracing described herein. However, optical beams may further be described to include multiple optical modes transversely disposed in relation to optical axes, such as optical axis 50, and typically include a desirable lowest order mode centered on or near optical axes. Similar to the tendency of radially distal rays to diverge more quickly than rays proximal to the relevant optical axis, diffraction losses for transverse modes having significant distal intensities are higher than the lowest order mode intensity. Accordingly, the centrally located lowest order mode will resonate first, consuming gain that would otherwise contribute to radially distal modes. Moreover, the low amount of remaining gain operates in conjunction with the higher losses experienced by such radially distal modes to inhibit the lasing of those modes. Unstable resonators consequently tend to have better beam quality than similarly sized stable and borderline stable resonators. Similar operation as described may be achieved in an optical parametric oscillator unstable resonator such as OPO unstable resonator 14.

Referring back to FIG. 1, other components are shown that may be disposed in the laser resonator volume 28 for interaction with the gain block pump light 38 or light at the laser resonator wavelength. For example, a polarizing optic 68 may be positioned separately from the gain block 30 or form a part of the block 30. A Q-switch element 70 for providing pulsed output may be positioned separately from the gain block 30 or it may form a part of the gain block 30. Other optical components (not shown) may also be disposed in OPO unstable resonator 14. Because laser and OPO resonators 12, 14 have separate respective end surfaces 22, 24 for the former and surfaces 46, 48 for the latter, the components for each may be separately aligned for optimal performance and ease of manufacture. For example, convex mirror 60 need only be configured for OPO unstable resonator 14, greatly simplifying manufacturing steps, such as coating application. Moreover, attributes of each resonator 12, 14 may be independently tuned for optimum performance. For example, the length between surfaces 46, 48 of OPO unstable resonator 14 may be lengthened or adjusted to increase beam quality or magnification without affecting the requirements of the laser resonator 12. Also, because resonator 12 is stable or bordering stable, light attributable to lasing therein is well-contained and therefore can maximize the nonlinear operation in crystal 40 situated in overlapping volume 16.

Coating 58 on second surface 48 of OPO unstable resonator 14 can also be coated with a variable reflectivity coating 72 having a parabolic, Gaussian, or super-Gaussian profile, by way of example. For pictorial purposes the variable coating 72 is shown to bulge out from convex mirror 60, demonstrating the relative degree of reflectivity across the surface 48. Various reflectivity profile parameters may be configured to provide optimal efficiency and beam quality in the far-field while also configured to provide effective overlap of the beam in the resonator with the nonlinear crystal 40. Variable reflectivity coating 72 also significantly improves the beam quality of the output beam 18 from the OPO unstable resonator 14 relative to a hard edged or uniform reflectivity mirror, by way of example. Thus, at a particular useful distance from the laser system 10 the shape of the output beam 18 can have better characteristics than beams provided by other systems. In some embodiments, beam qualities are achieved with $M^2$ values of 5 or less.

Figure 4:
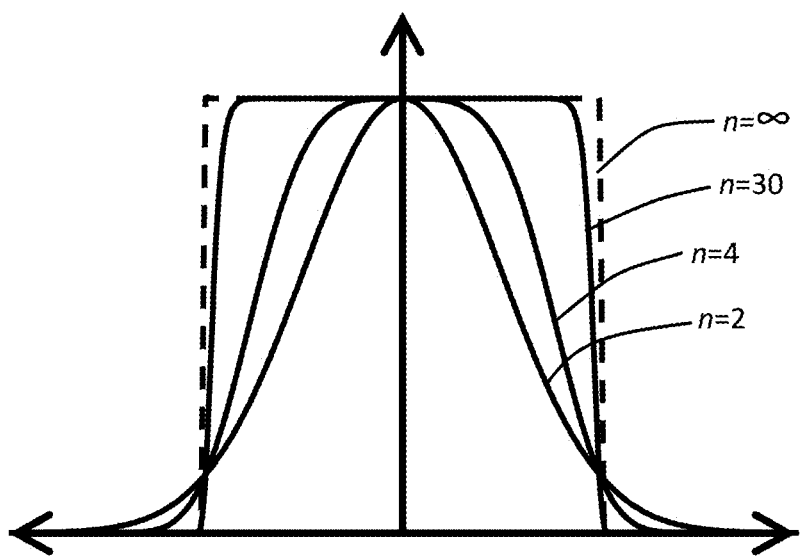
FIG. 4 is chart of various Gaussian profiles according to an aspect of the present invention.

With reference to FIG. 3, there is shown a front view of the round convex mirror 60 of FIG. 1 that has the variable reflectivity coating 72 on the surface 48. Projected above and to the right of the mirror 60 are sample plots 74 showing spatially variable reflectivity profiles across two spatial dimensions. In some embodiments, super-Gaussian profiles may be used. For example, referring to FIG. 4, normalized super-Gaussian profiles are shown of orders two, four, thirty, and infinity (dashed). Other non-Gaussian shapes may be used as well, such as triangular, stepped, etc., however softer changes in reflectivity are generally preferred as they tend to provide better beam quality for output beam 18.

Referring back to FIG. 1, the OPO unstable resonator 14 is defined by a flat-convex relationship for the respective resonator surfaces 46, 48. In some embodiments the respective surfaces 46, 48 have configurations other than flat-convex. For example, some examples include a concave first surface 46 and a convex second surface 48. Other examples include flat first and second surfaces 46, 48 as well as intracavity elements providing the requisite optical power to provide instability to the resonator 14. In still other examples, a normally stable flat-concave resonator is made unstable by providing a sufficient length between the flat first surface 46 and concave second surface 48 to provide the requisite instability. In some examples, various elements of the aforementioned resonator types may be combined. The aspects of the resonator 14 as just described also apply to the resonator 14' of FIG. 2.

As was discussed earlier, the various components of laser system 10 are typically mounted onto a temperature coefficient matched substrate 20. Substrate 20 can be a crystal substrate having similar characteristics as one or more of the crystals used in laser system 10, or of the various lenses disposed therein. The laser system 10 with the various components thereof fixedly attached or mounted to the substrate 20 can thus form a singular block of elements, or monoblock. Disposing the various components in relation to each other and substrate 20 in this way is advantageous for manufacturability as well as performance.

It is thought that the present invention and many of the attendant advantages thereof will be understood from the foregoing description and it will be apparent that various changes may be made in the parts thereof without departing from the spirit and scope of the invention or sacrificing all of its material advantages, the forms hereinbefore described being merely exemplary embodiments thereof.

What is claimed is:

1. A laser system comprising:
    a laser resonator having a laser resonator volume and a gain block disposed therein, said gain block configured to emit light at a predetermined laser wavelength; and
    an OPO unstable resonator having an OPO unstable resonator volume and only one OPO output coupler, said OPO unstable resonator optically coupled to said laser resonator and configured to receive light therefrom;
    wherein a portion of said OPO unstable resonator volume is situated with respect to said laser resonator volume so as to form an overlapping volume.

2. The laser system of claim 1 wherein said laser resonator is a stable or borderline stable resonator.

3. The laser system of claim 1 wherein said OPO unstable resonator includes an optical parametric gain crystal disposed in said overlapping volume.

4. The laser system of claim 3 wherein said laser resonator and said OPO unstable resonator each includes a high reflector, said each high reflector defining an opposite end of said overlapping volume.

5. The laser system of claim 3 wherein said gain block is disposed along an optical axis such that light emitted at the predetermined laser wavelength is directed to said optical parametric gain crystal for nonlinear frequency conversion to a predetermined OPO signal wavelength.

6. The laser system of claim 5 further comprising a pump source optically coupled to said laser resonator for pumping said gain block therein.

7. The laser system of claim 1 wherein said OPO output coupler has a variable reflectivity.

8. The laser system of claim 7 wherein said variable reflectivity has a Gaussian profile.

9. The laser system of claim 8 wherein said Gaussian profile has an order of 6 or greater.

10. The laser system of claim 1 wherein said OPO unstable resonator includes a flat high reflector and a convex output coupler.

11. The laser system of claim 1 wherein said laser resonator has an optical axis that includes one or more optical components arranged therealong.

12. The laser system of claim 11 wherein said optical axis is a straight optical axis containing no reflective bends.

13. The laser system of claim 1 wherein said laser resonator and said OPO unstable resonator have respective magnifications that can be controlled independent of each other.

14. The laser system of claim 1 wherein said OPO unstable resonator has a length selectable independent from said laser resonator.

15. The laser system of claim 1 wherein said laser resonator and said OPO unstable resonator are fixedly positioned in relation to a thermally matched substrate.

16. The laser system of claim 1 wherein said OPO unstable resonator is capable of providing an output beam having an $M^2$ value of 5 or less.

17. A monoblock laser system comprising:
a laser resonator including first and second reflectors defining a stable or borderline stable resonator volume and including a gain block capable of emitting light at a first wavelength; and
an unstable resonator including first and second reflectors defining an unstable resonator volume and including an optical parametric gain crystal capable of emitting light at a second wavelength using light at the first wavelength, said unstable resonator second reflector capable of transmitting an output beam at the second wavelength;
wherein said unstable resonator volume overlaps said laser resonator volume such that said unstable resonator second reflector is not also said laser resonator second reflector.

18. The monoblock laser system of claim 17 wherein the output beam exhibits a beam quality $M^2$ value that is lower than output beam qualities of laser systems that include a stable or borderline stable resonator in the place of said unstable resonator.

19. The monoblock laser system of claim 17 wherein the output beam has an $M^2$ beam quality of 5 or less.

20. The monoblock laser system of claim 17 further comprising a thermally matched substrate wherein said laser resonator and said unstable resonator are fixedly positioned in relation to said thermally matched substrate.

21. The monoblock laser system of claim 17 wherein said unstable resonator first and second reflectors are flat and convex, respectively.

22. The monoblock laser system of claim 17 wherein the second wavelength is in the range of 1 to 2 μm.

23. A laser system comprising:
a laser resonator and volume defined thereby, said laser resonator configured to be stable or borderline stable; and
an unstable resonator and volume defined thereby;
wherein a portion of said unstable resonator volume overlaps said laser resonator volume;
wherein said unstable resonator includes an output coupler having a variable reflectivity that is spaced apart from the overlapping volume.

24. The laser system of claim 3 wherein said optical parametric gain crystal includes an output face that is AR coated at the OPO wavelength.

25. The laser system of claim 17 wherein said optical parametric gain crystal includes an output face that is AR coated at the OPO wavelength.

26. The laser system of claim 23 wherein said unstable resonator volume includes an OPO gain crystal having an output face facing towards said output coupler and wherein said output face is AR coated.

27. The laser system of claim 23 wherein said output coupler is the only output coupler of said unstable resonator.

* * * * *